Dec. 14, 1965   N. A. WRIGGLESWORTH   3,222,987
LENS MOUNTING AND ADJUSTMENT MEANS FOR TELESCOPIC SIGHTS
Filed June 10, 1960
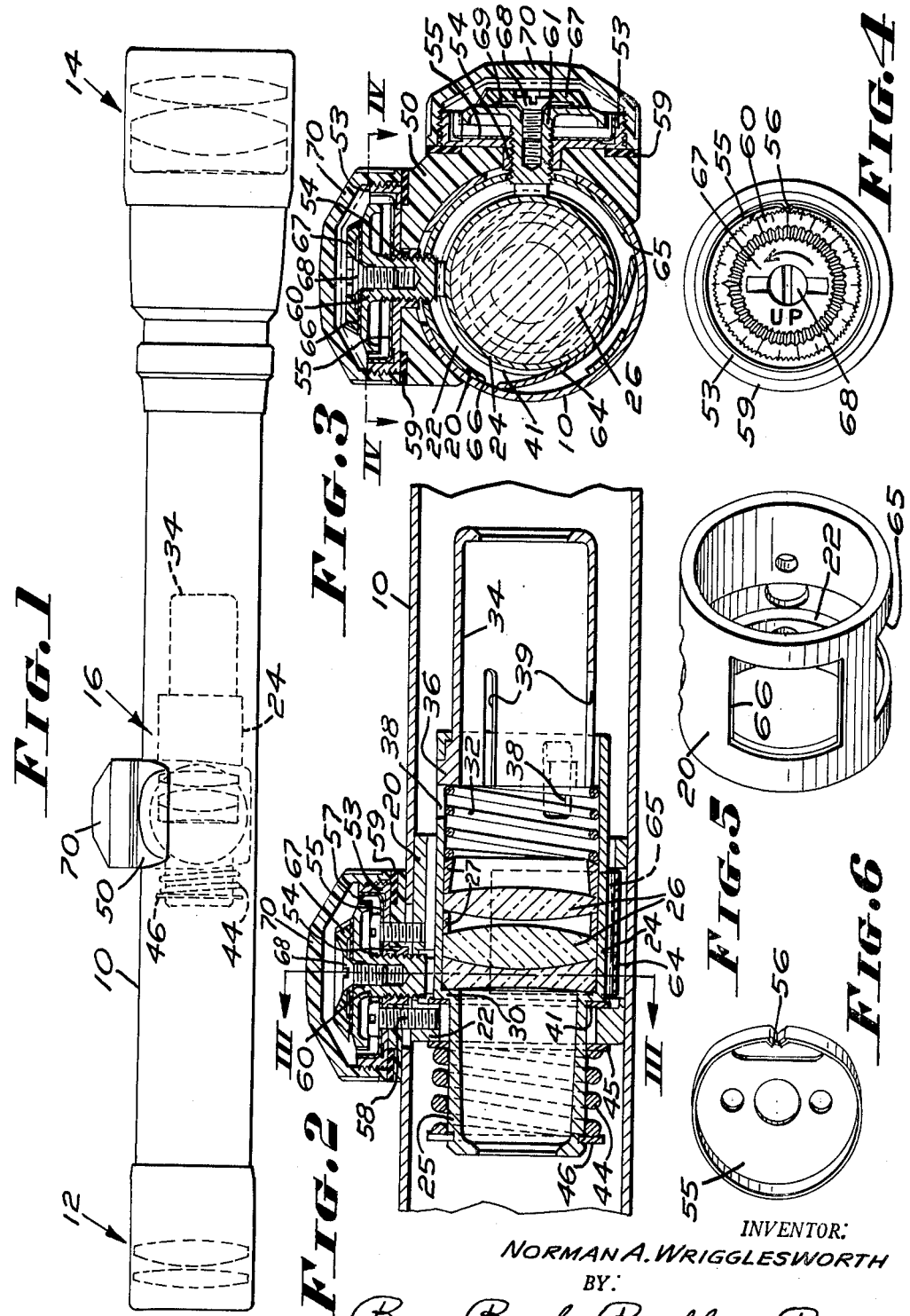
INVENTOR:
NORMAN A. WRIGGLESWORTH
BY:
Beau, Brooks, Buckley & Beau,
ATTORNEYS.

United States Patent Office 3,222,987
Patented Dec. 14, 1965

3,222,987
LENS MOUNTING AND ADJUSTMENT MEANS FOR TELESCOPIC SIGHTS
Norman A. Wrigglesworth, Buffalo, N.Y., assignor to American Optical Company, Southbridge, Mass.
Filed June 10, 1960, Ser. No. 35,300
1 Claim. (Cl. 88—32)

This invention relates to windage and elevation adjustment means for telescopic rifle sights, and more particularly to an improved means for mounting and adjusting the erector lens assembly for obtaining windage and elevational corrections.

It is well known in the art to provide a telescopic rifle sight with windage and elevation adjustments which operate to shift the erector lens assembly in the proper directions so as to alter the position of the image seen through the eye piece. Such means of the prior art have proved to be generally satisfactory, but in the past been quite expensive and have had certain other disadvantages including tendencies of certain of the parts to harden under the gun recoil shocks. Also, such prior devices sometimes operate to cause the erector lens assembly to tilt out of the plane of proper alignment incidental to user adjustments of the device.

One object of the present invention is to provide an improved windage and elevation adjustment mechanism in which the erector lens assembly is maintained in exact normality to the sighting line of the telescope under any and all conditions of adjustment.

Another object of the invention is to provide an improved arrangement as aforesaid which will withstand recoil shocks of great magnitude without becoming misaligned or otherwise damaged.

Another object of the invention is to provide an improved device as aforesaid which will permit great accuracy of adjustments without requiring the use of precisely machined parts.

Still another object of the invention is to provide a device as aforesaid in which the components thereof are so designed as to provide materials cost and weight savings, as well as considerable savings in assembly time and simplification of assembly techniques.

Other objects and advantages will appear from the detailed description hereinbelow and the accompanying drawings wherein:

FIG. 1 is a somewhat schematic side elevational view of a telescope sight in which the device of the invention is used;

FIG. 2 is a fragmentary longitudinal sectional view taken on enlarged scale through that portion of the telescope which houses the windage and elevational adjustment device of the invention;

FIG. 3 is a sectional view taken along line III—III of FIG. 2;

FIG. 4 is a sectional view taken substantially along line IV—IV of FIG. 3;

FIG. 5 is a perspective view of one of the parts of the device of the invention; and FIG. 6 is a perspective view of another part of the device of the invention.

In the drawings, the windage and elevational adjustment device of the invention is illustrated as being mounted in a conventional telescopic rifle sight which is schematically shown in FIG. 1 as including a casing 10 having an object lens assembly 12 at one end thereof, an eye piece lens assembly 14 at the other end thereof, and an erector lens assembly 16 mounted intermediately of the object lens and the eye piece.

The windage and elevational adjustment device includes a mounting sleeve 20 which is dimensioned to fit snugly within the telescope housing 10. The mounting sleeve 20 is cylindrical in form and is provided with an inwardly projecting flange or shoulder 22 at one end thereof and is slotted and bored for purposes as will be described hereinbelow. The mounting sleeve 20 carries the erector lens assembly of the telescope in vertically and laterally adjustable relation thereto in the following manner. A lens housing 24 of cylindrical form and of substantially smaller diameter than the mounting sleeve 20 mounts therewithin an erector lens assembly comprising lenses 26—26 and spacing sleeves 27—27. The lens assembly is held between a shoulder formed by a stepped-down portion 30 of the housing 24 and a compression spring 32 which abuts its outer end against a shoulder formed by the end of a housing extension 34. As is best seen in FIG. 2, the housing extension 34 is retained in the housing 20 by a series of dog portions 36 extending radially at intervals around the circumference of the extension 34, which engage in slots 38 formed in the walls of the main housing 24. The housing extension 34 is formed of resilient material such as spring metal or plastic and is longitudinally slotted as shown at 39 so that the dogs 36 are carried by spring finger portions that may be squeezed together so that the dogs 36 will clear the housing 24 when being inserted therein. When released, the extension member 34 will return to its normal shape and the dogs 36 will thereby be engaged with the slots 30.

The housing 24 is carried in the mounting sleeve 20 in the following manner. The housing is placed with the external shoulder formed by the step-down portion 30 abutting the shoulder 22 of the mounting sleeve 20. Preferably, a bearing washer 41 is provided between the parts 20 and 24 at the point of engagement as shown. A stiff mounting spring 44 fits over the reduced diameter nose portion 25 at the forward end of the housing 24 and is confined between a second bearing washer 45 which lies against the outer face of shoulder 22 and a circlip 46 which is engaged within a groove provided therefor at the front end of the nose portion 25. Thus the housing 24 is firmly held in position within the mounting sleeve 20 in the direction of its longitudinal axis, but under suitable radially directed pressure may be shifted in the plane normal to the longitudinal axis of the mounting sleeve within the limits provided by the differences in diameter of the housing 24 and the inner bore of the sleeve 20.

The entire sub-assembly as described above is mounted within the telescope barrel 10 by the following means. A mounting base 50 having its inner surface arcuately shaped to fit closely against the housing is mounted externally of the housing 10. Externally, the base member 50 is formed with a pair of flat lands disposed at right angular relationship above and at one side of the telescope. A circular tray device 53 is disposed to rest on each land portion and each tray is provided with a hub which is press-fitted into a corresponding bore formed in the base 50. A spring tray 55 (FIGS. 2, 3, 6) is fitted within each tray 53, and in each case a pair of mounting screws 57, 58 are provided to pass through diametrically disposed bores provided in the spring tray 55 and the mounting tray 53 and the mounting base 50, and thence through the wall of the telescopic housing 10 into threaded engagement with the mounting sleeve 20, as shown. Thus the mounting sleeve 20 is secured within the telescopic housing 10, and the base member 50 and tray members 53 and 55 are secured to the outside of the housing.

Wherever necessary the openings provided in the various elements of the mechanism for passage of the mounting screws are of slotted form, so that the entire assembly may be easily adjusted longitudinally of the telescopic housing at the factory for accurate parallax adjustment of the erecting lens assembly. Sealing washer 59 are used between the mounting base 50 and the mounting trays 53 as shown to assure complete atmospheric sealing off of the telescopic assembly.

As shown in the drawings, the inner surface of the hub portion 54 of each mounting tray 53 is threaded to receive an adjustment screw 60, 61. The adjustment screws are threaded through their respective mounting plates, pass through cutout portions provided in the housing 10 and sleeve 20, and bear in pressure applying relation against 90° spaced apart portions of the housing 24. The vertically disposed screw 60 engages the top of the lense housing 24, and the position of its adjustment will determine the elevational setting of the erecting lens. The horizontally oriented adjusted screw 61 engages one side of the lens housing and provides means for adjusting the horizontal or "windage" setting of the instrument. The mounting of the erector lens assembly is completed by provision of a leaf spring 64 which is mounted within the housing 10 as best seen in FIG. 3. Slots 65, 66 are cut in the wall of the mounting sleeve 20 so that the ends of the spring 64 may bear directly against the telescopic housing 10 while the lens housing 24 bears against the center area of the spring 64. Thus the erector lens assembly is positively held in positional adjustment by the triangular support comprising the spring 64, elevation control screw 60, and "windage" control screw 61.

The adjustment screws 60, 61 are identical in structure and, as best seen in FIG. 4 the outer peripheries of the screws are provided with knurled surfaces. Also as best seen in FIG. 4 the upstanding wall of each spring tray 55 is provided with an inwardly projecting detent portion 56 for engagement with the knurled wall of the adjustment screw, whereby an audible, positive, step-by-step click adjustment device is provided. For the dual purposes of providing an easy adjustment of the screws and a memory disk setable at a base position, the adjustment screws each includes a knurled finger button segment 67 which is mounted upon the adjustment screw by means of a screw 68 which threads into the center of the adjustment screw as shown. Thus the finger button 67—67 may be independently rotatably adjusted relative to their respective adjustment screws. A friction washer 69 may be provided between the finger buttons and the adjustment screws as shown, to assure positive non-slipping engagements between the buttons and screws when the screws are tightened down. Thus, subsequent turning of the finger buttons will effect adjustments of the related adjustment screws. The entire adjustment device is protected from the elements and from inadvertent misadjustments of the desired settings of the finger buttons by caps 70—70 which are threaded onto the peripheries of the mounting trays 53—53.

By virtue of the present invention, the means for mounting the lens housing 24 to the mounting sleeve 20, and the relative location of the adjustment screws to the area of contact of the sleeve 20 and housing 24, provides for positive, non-tilting motion of the lens housing in response to adjustment forces from the adjusting screws, whereby the erecting lens assembly is never subjected to forces tending to disorient it from its proper angular alignment. Thus it will be apparent that the windage and elevational adjustment device of my invention provides important improvements, both as to structural form and function, whereby precise adjustment control is facilitated by means of a mechanism which is rugged and fool-proof and simple and inexpensive to fabricate, assemble and adjust.

It will of course be appreciated that although only one form of the windage and elevation adjustment means of the invention has been shown and described in detail herein, certain changes and modifications may be made therein without departing from the spirit of the invention or the scope of the appended claim.

What is claimed is:

In a telescopic sight, a lens housing including a cylindrical main body portion and a reduced diameter nose portion, the juncture of said main body portion and said nose portion presenting radially extending inner and outer faces, an erector lens group seated upon said inner face within said main body portion, a lens housing extension removably fixed to that end of the lens housing remote from said nose portion, resilient means interposed between said extension and said lens group holding the latter in seated relation against said inner face, a cylindrical mounting sleeve receiving said main body portion of the lens housing and having an inwardly projecting annular shoulder at one end through which said nose portion of the lens housing projects, said mounting sleeve and lens housing radial clearance therebetween, and resilient means mounted on said nose portion and engaging the outer side of said annular shoulder to maintain said outer face of the lens housing in seated relation with the inner side of said annular shoulder.

References Cited by the Examiner

UNITED STATES PATENTS

| | | | |
|---|---|---|---|
| 2,024,018 | 12/1935 | Wollensak | 88—34 X |
| 2,150,629 | 3/1939 | Mossberg | 88—32 X |
| 2,189,766 | 2/1940 | Unertl | 88—32 X |
| 2,441,104 | 5/1948 | Schubert et al. | 88—57 |
| 2,483,897 | 10/1949 | Godfrey | 88—32 X |
| 2,668,469 | 2/1954 | Gabel | 88—57 X |
| 2,670,656 | 3/1954 | Braymer | 88—32 |
| 2,948,188 | 8/1960 | Kollmorgen | 88—32 |
| 2,955,512 | 10/1960 | Kollmorgen et al. | 88—32 |

FOREIGN PATENTS

| | | |
|---|---|---|
| 428,618 | 5/1926 | Germany. |
| 704,350 | 2/1954 | Great Britain. |

DAVID H. RUBIN, *Primary Examiner.*

EMIL G. ANDERSON, *Examiner.*